US007950836B2

(12) United States Patent
Veiga et al.

(10) Patent No.: US 7,950,836 B2
(45) Date of Patent: May 31, 2011

(54) EMI CONTROLLED INTEGRAL HID REFLECTOR LAMP

(75) Inventors: Louie Daniel Veiga, Nashua, NH (US); Randall D Brown, Barrington, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 253 days.

(21) Appl. No.: 12/151,819

(22) Filed: May 9, 2008

(65) Prior Publication Data

US 2009/0279308 A1 Nov. 12, 2009

(51) Int. Cl.
*B60Q 1/00* (2006.01)

(52) U.S. Cl. ........................................................ 362/519

(58) Field of Classification Search .................. 362/507, 362/519, 263–265, 652, 655–659
See application file for complete search history.

(56) References Cited

U.S. PATENT DOCUMENTS

| | | | | |
|---|---|---|---|---|
| 3,648,045 | A * | 3/1972 | Le Vantine et al. | 362/265 |
| 3,935,442 | A * | 1/1976 | Hanson | 362/4 |
| 4,345,178 | A * | 8/1982 | Pappas et al. | 313/113 |
| 4,423,471 | A * | 12/1983 | Gordin et al. | 362/96 |
| 4,480,296 | A * | 10/1984 | Gagnon et al. | 362/519 |
| 4,920,459 | A * | 4/1990 | Rothwell et al. | 362/546 |
| 5,113,121 | A | 5/1992 | Lapatovich et al. | |
| 5,957,571 | A * | 9/1999 | Koster et al. | 362/306 |
| 5,993,034 | A | 11/1999 | Kace, Jr. et al. | |
| 6,505,958 | B2 * | 1/2003 | Ooms et al. | 362/296.07 |
| 6,566,817 | B2 | 5/2003 | Lapatovich | |
| 6,863,418 | B2 * | 3/2005 | Masuoka et al. | 362/264 |
| 6,916,204 | B2 | 7/2005 | Duarte et al. | |
| 6,997,579 | B2 * | 2/2006 | Horiuchi et al. | 362/267 |
| 2004/0095765 | A1 * | 5/2004 | Hataoka et al. | 362/263 |
| 2005/0231955 | A1 * | 10/2005 | Gordin et al. | 362/263 |
| 2006/0170360 | A1 | 8/2006 | Lesch et al. | |
| 2006/0226782 | A1 * | 10/2006 | Collins et al. | 313/637 |
| 2008/0205064 | A1 * | 8/2008 | Ooms | 362/310 |

FOREIGN PATENT DOCUMENTS

| | | | |
|---|---|---|---|
| DE | 10 2004 043107 | | 3/2006 |
| EP | 0449639 | | 10/1991 |
| FR | 2705434 | | 11/1994 |
| FR | 2705434 | A1 * | 11/1994 |
| WO | WO2006075259 | * | 7/2006 |

OTHER PUBLICATIONS

PCT Search Report on PCT Patent Application No. PCT/US2009/039333, mailed Nov. 19, 2009.

* cited by examiner

*Primary Examiner* — Julie A Shallenberger
(74) *Attorney, Agent, or Firm* — Edward S. Podszus

(57) ABSTRACT

An integral HID reflector lamp may be formed with an HID held in a reflector. An inner element is mechanically coupled to the reflector. The inner element is formed with a first mechanical coupling to mate with the reflector, a second mechanical coupling to mate with a circuit board, and an electrical coupling to at least electrically couple one of the leads to the circuit board. A circuit board has an edge mechanically coupled to the inner element and electrically connected to the leads by an electrical coupling on the inner element. A heat sink spans at least one side of the circuit board and forming an EMI shielding. An outer cover encloses the heat sink, circuit board, and inner element and coupled to the assembly of the reflector, HID lamp, inner element, and heat sink with each elements of the assembly clipped together.

8 Claims, 12 Drawing Sheets

EMI CONTROLLED INTEGRAL HID REFLECTOR LAMP

BACKGROUND OF THE INVENTION

1. Field of the Invention

The invention relates to electric lamps and particularly to electric HID lamps. More particularly the invention is concerned with HID lamps with reflectors for use in threaded sockets.

2. Description of the Related Art Including Information Disclosed Under 37 CFR 1.97 and 1.98

High intensity discharge (HID) lamps can be very efficient with lumen per watt factors of 100 or more. HID lamps can also provide excellent color rendering. Historically HID lamps required separate starting and ballasting equipment and therefore could not be used interchangeably with incandescent lamps in standard sockets. This limited their market use to professional applications, and essentially denied them to the general public that could benefit from the technology. With the advent of circuit miniaturization, ballast and starting circuits have become smaller, but their performance has been affected by ambient operating temperature. HID lamps are known to put out a large amount of heat, and this factor and others have generally kept the starting and ballasting features separate from the lamp body. There is then a need for an integral HID lamp with onboard control circuitry that is unaffected by the heat from an adjacent HID lamp. Because of the high voltages used in integral HID lamps, electrical security has prevented them from being commonly used by consumers. There is a need for an integral HID lamp with little or no safety issues with regard to common uses. There is then a need for an integrated HID lamp that is safe for use in incandescent lamp sockets.

BRIEF SUMMARY OF THE INVENTION

An integral HID lamp may be formed with EMI protection. The lamp includes a reflector having a wall defining a cavity having an electrically conductive metal layer providing a light reflective surface; a high intensity discharge (HID) lamp having a first electrode and a second electrode positioned in the reflector, and electrically coupled by a first lead and a second lead to an electronic control circuit to drive the HID lamp. The first lead is electrically coupled to the metal layer.

DETAILED DESCRIPTION OF THE INVENTION

Figure 1:
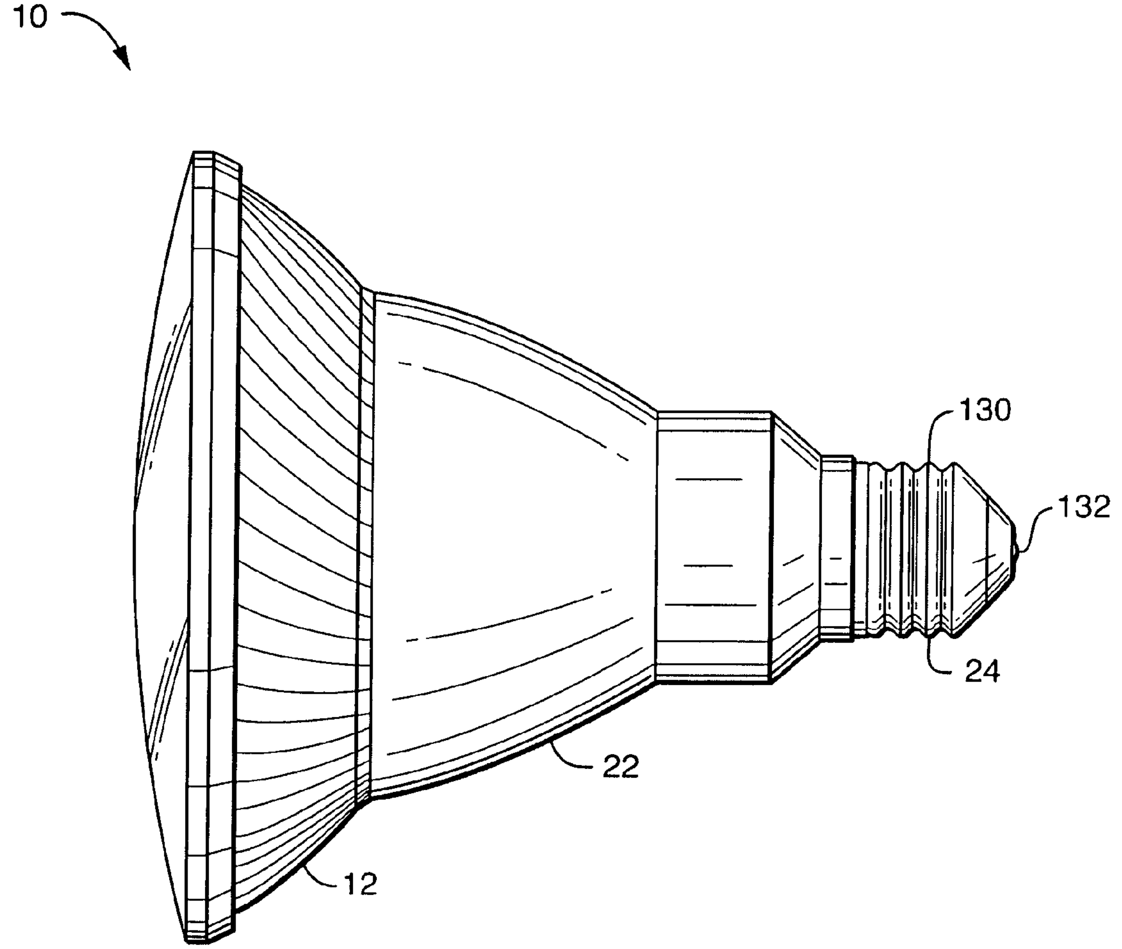
FIG. 1 shows a side perspective view of a preferred embodiment of an HID reflector lamp.

FIG. 1 shows a side perspective view of a preferred embodiment of an HID reflector lamp 10. The HID reflector lamp assembly 10 is made from a reflector 12, a lamp capsule 14, an inner element such as an inner cover 16, a circuit board 18, a heat sink 20, an outer cover 22 and a thread base 24. A front cover lens may also be used to close the forward end of reflector 12.

Figure 2:
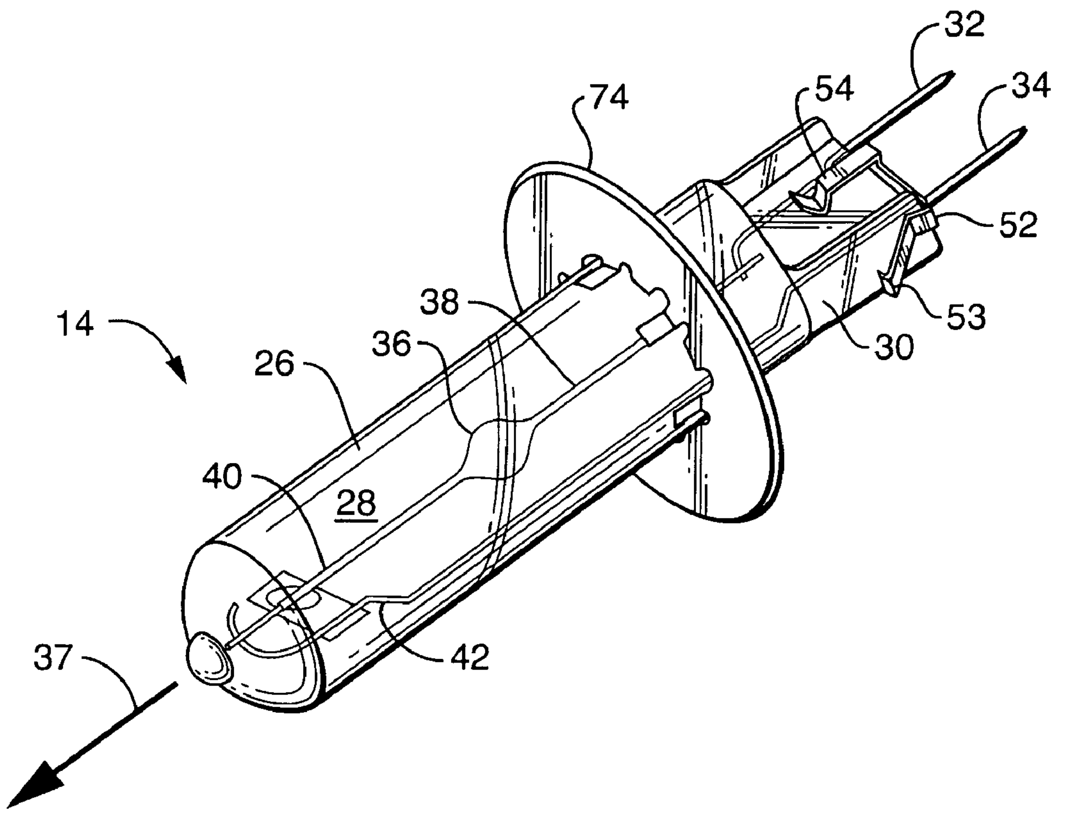
FIG. 2 shows a side perspective view of a preferred embodiment of an integral HID lamp, support ring and contact clip assembly.

FIG. 2 shows a side perspective view of a preferred embodiment of an integral HID lamp capsule 14, support ring 74 and contact clip 52 assembly. The HID lamp capsule 14 has a wall 26 defining an enclosed volume 28, and a sealed end 30 with at least two extending electrical connections, first lead 32, and second lead 34. The preferred capsule 14 is a tubular lamp capsule with a press sealed end 30. The preferred lamp capsule 14 includes a ceramic lamp 36, such as a Power Ball, but any similarly small ceramic or quartz HID lamp structure may be adapted for use in the present HID lamp capsule 14 structure. In the preferred embodiment, the ceramic lamp 36 extends axially 37 with a first end 38 electrically coupled near the sealed end 30 to the first lead 32, and a second end 40 coupled through a lead 42 that extends back along but offset from the long side of the ceramic lamp 36 to be electrically coupled to the second lead 34. This second coupling path 40, 42, 34 is axially longer than the other path (38, 32) and provides a better path of the two paths for suppressing EMI.

Figure 12:
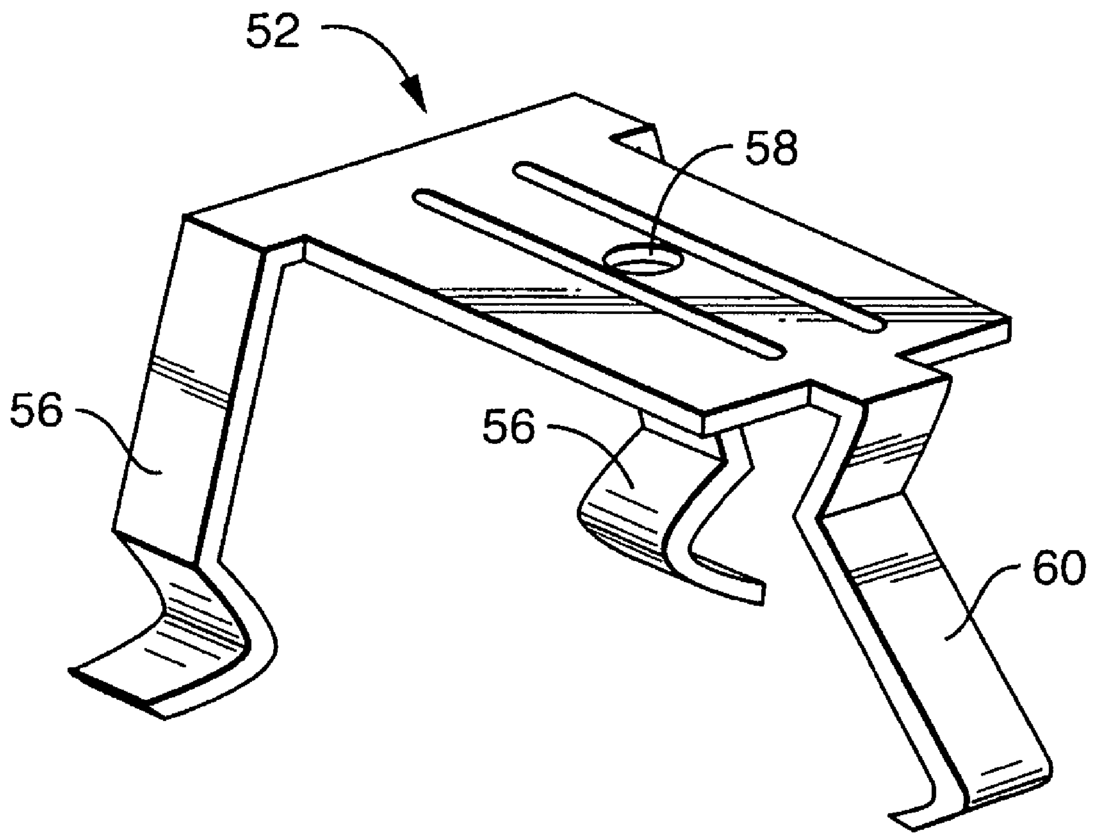
FIG. 12 shows a rear view of a preferred embodiment of the HID lamp reflector of FIG. 3.

FIG. 12 shows a perspective view of a preferred embodiment of an electrically conductive spring clip 52. In the preferred embodiment, electrically coupled the second lead 34 is an electrical tap that contacts a metal layer 44 formed on the reflector 12. The preferred tap is a spring steel clip 52 that clips with spring arms 54, 56 to the press sealed end 30 of lamp capsule 14. The clip 52 includes a hole 58 formed with a tab 60 to slide over and then latch with the second lead 34, as the rest of the clip 52 mates (clips) with the press sealed end 30 of the lamp capsule 14. The tab 60 extends from the clip 52 as a spring arm to make an electrical connection from the second lead 34 to the metal layer 44 formed on the reflector 12.

Figure 3:
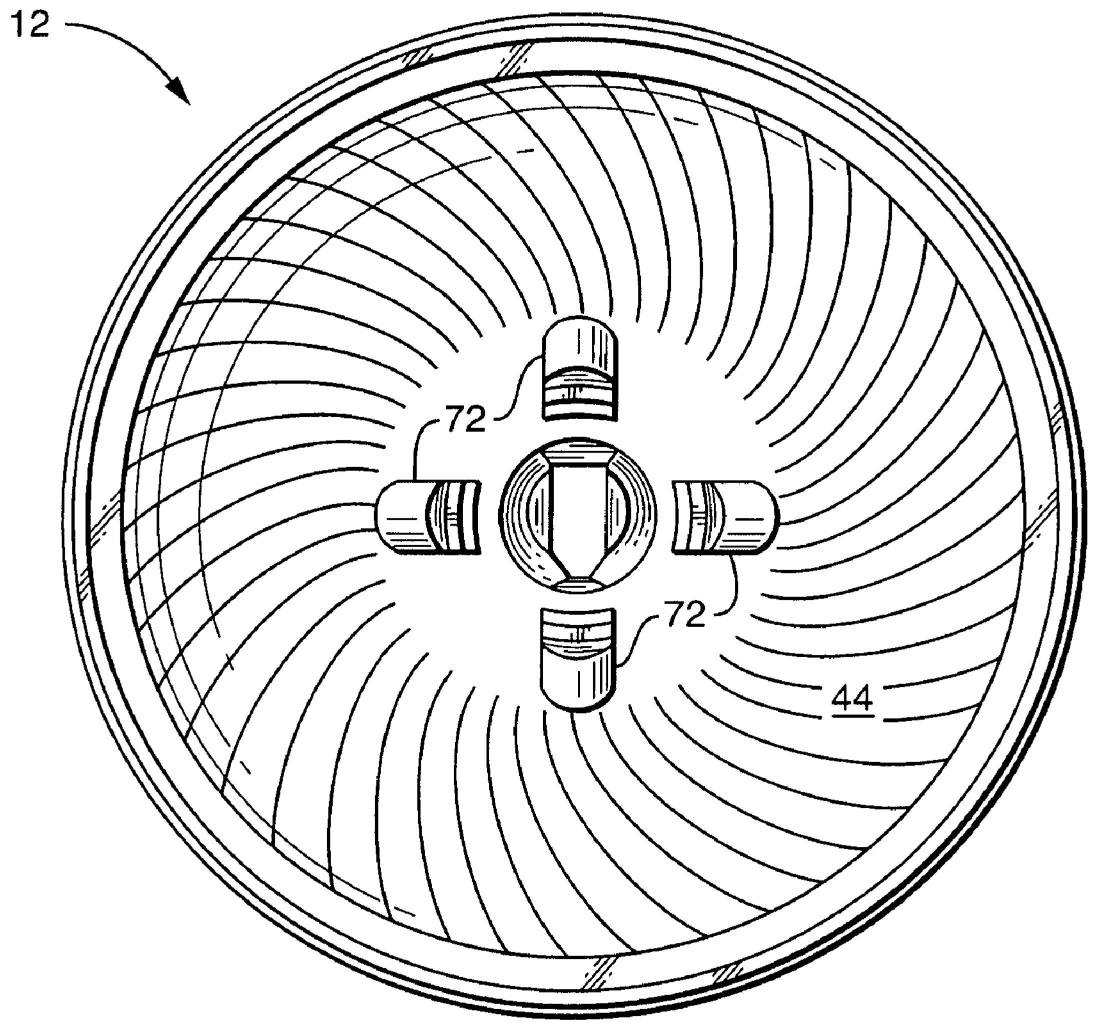
FIG. 3 shows a front view of a preferred embodiment of an integral HID lamp reflector.
Figure 4:
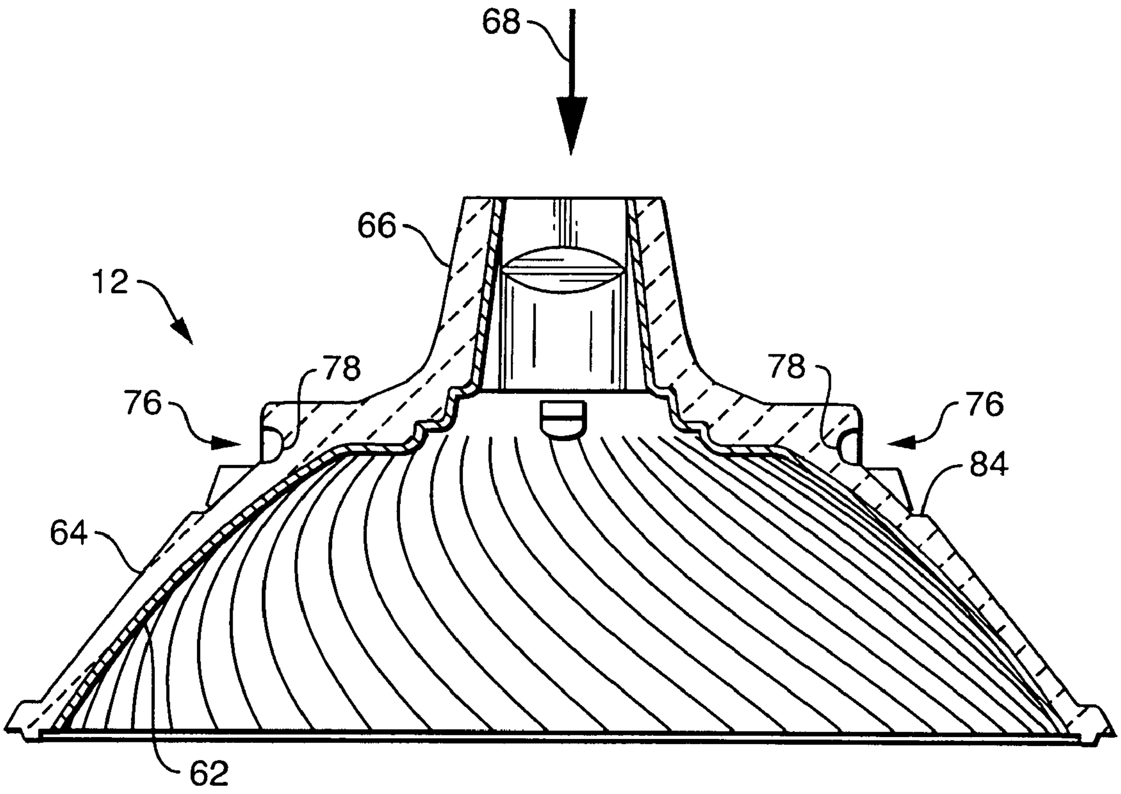
FIG. 4 shows a cross sectional view of a preferred embodiment of a preferred reflector of FIG. 3.
Figure 5:
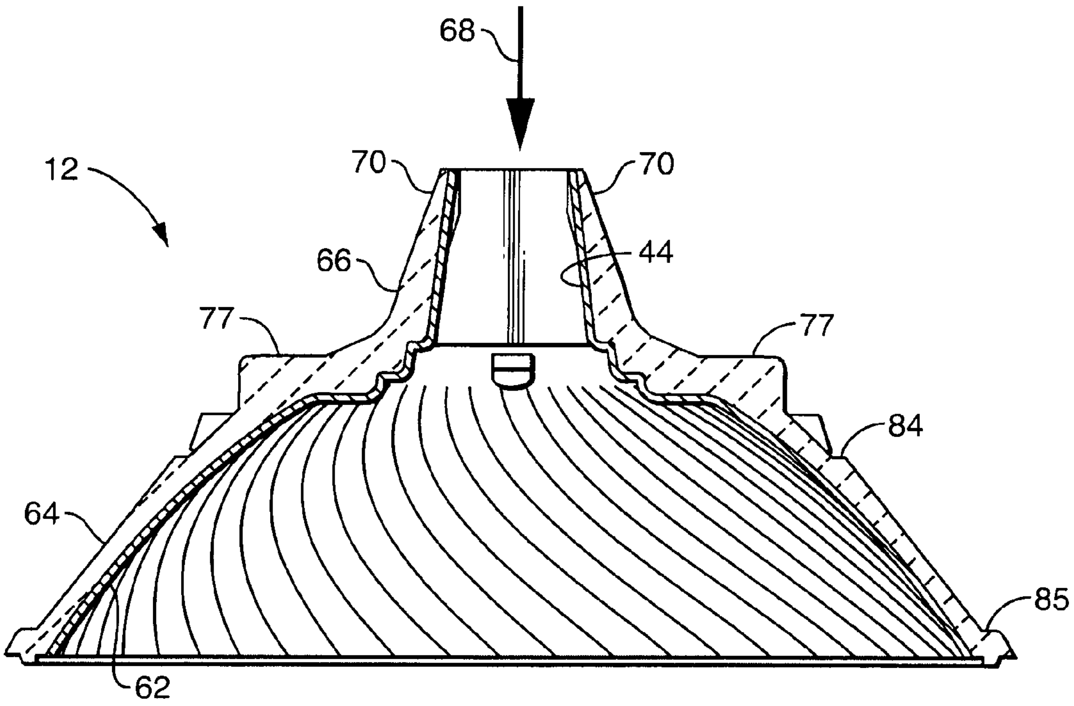
FIG. 5 shows a cross sectional view of a preferred embodiment of the preferred reflector of FIG. 4, rotated axially 90 degrees.

FIG. 3 shows a front view of a preferred embodiment of an integral HID lamp reflector 12. FIG. 4 shows a cross sectional view of a preferred embodiment of the same preferred reflector 12. FIG. 5 shows a cross sectional view of a preferred embodiment of the same preferred reflector 12, rotated axially 90 degrees. The reflector 12 has the form of concave shell with a front side 62 and a rear side 64. A neck 66 extends rearward along the reflector's axis 37 and defines a through passage 68 extending from the front side 62 to the rear side 64. The preferred rear side 64 of the neck 66 is formed with one or more alignment faces, such as the side sloping planar faces 70 to mate with corresponding faces formed on the inside of the inner element such as inner cover 16. The reflector 12 has a reflective metal layer 44 on the front side 62. In the preferred embodiment the reflective metal layer 44 is made with a metal such as aluminum that extends into the through passage 68 where an electrical contact to the metal layer 44 may be made, for example with clip 52 with a spring arm, tab 60. The preferred embodiment, the metal layer 44 extends substantially around, or as far as practicable, around the body of the lamp capsule 14, such as into the neck 66 and passage 68 region and to the exterior rim at the front end of the reflector 12. The metal layer 44 then defines an EMI capture cage extending substantially around the ceramic lamp 36. It is useful for electrical connection that the metal layer 44 be sufficiently thick in the neck 66 and passage 68 area of the reflector 12 to enable sufficient electrical contact in the neck 66 region. If the metal layer 44 in the neck 66 is thin, it may be scratched thorough or may otherwise not provide a sufficiently conductive connection. Applicants have found it useful to place a small section of electrically conductive tape (not shown) on the interior of the neck 66 where the electrical contact to the metal layer 44 is made. The tape avoids problems with making a sufficiently conductive and durable electrical connection to the coating 44 in the passage 68. It is expected that additional aluminization of the neck 66 interior (passage 68) will make the tape unnecessary. The HID lamp capsule 14 is positioned with its light generating region facing or exposed to the reflective metal layer 44, and is otherwise positioned axially 37 to be aligned in the reflector neck 66. In the preferred embodiment the front side 62 of the reflector 12 is also formed with a step and or protruding nubs 72 formed around the opening of the through passage 68 to position a spacer ring 74 to brace between the exterior wall of the lamp capsule 14 and the front side 62 of the reflector 12. The spacer ring 74 axially positions and braces the lamp capsule 14 in the reflector 12. The electrical connections 32, 34 of the lamp capsule 14 are positioned to be exposed for electrical connection at an end of the neck 66 adjacent the rear side 64 of the reflector 12.

FIG. 12 shows a rear view of a preferred embodiment of an integral HID lamp reflector 12. The rear side 64 of the preferred reflector 12 is formed to include two or more snap recesses 76 and two or more alignment nubs 77 and a positioning ledge 84. The snap recess 76 may be formed with an indentation 78 to receive and hold a latching face 90 of a corresponding latch 82 formed on the inner cover 16. The preferred indentations 78 extend inwards, towards the central axis 37 of the reflector 12. The exterior faces aside the snap recess 76 which may be planer sections adjacent the indentations 78 then face away from the reflector axis 37 and are preferably parallel with the axis 37. The preferred reflector 12 includes circular rib or ledge 84 formed the rear side 64, extending around the axis 37 radially exterior from the snap recess 72 that a front rim 86 of the outer cover 22 can be seated on or braced against. The preferred reflector 12 also includes nub 88 formed along the rib or ledge 84 to key with notch 140 formed on the outer cover 22.

Figure 6:
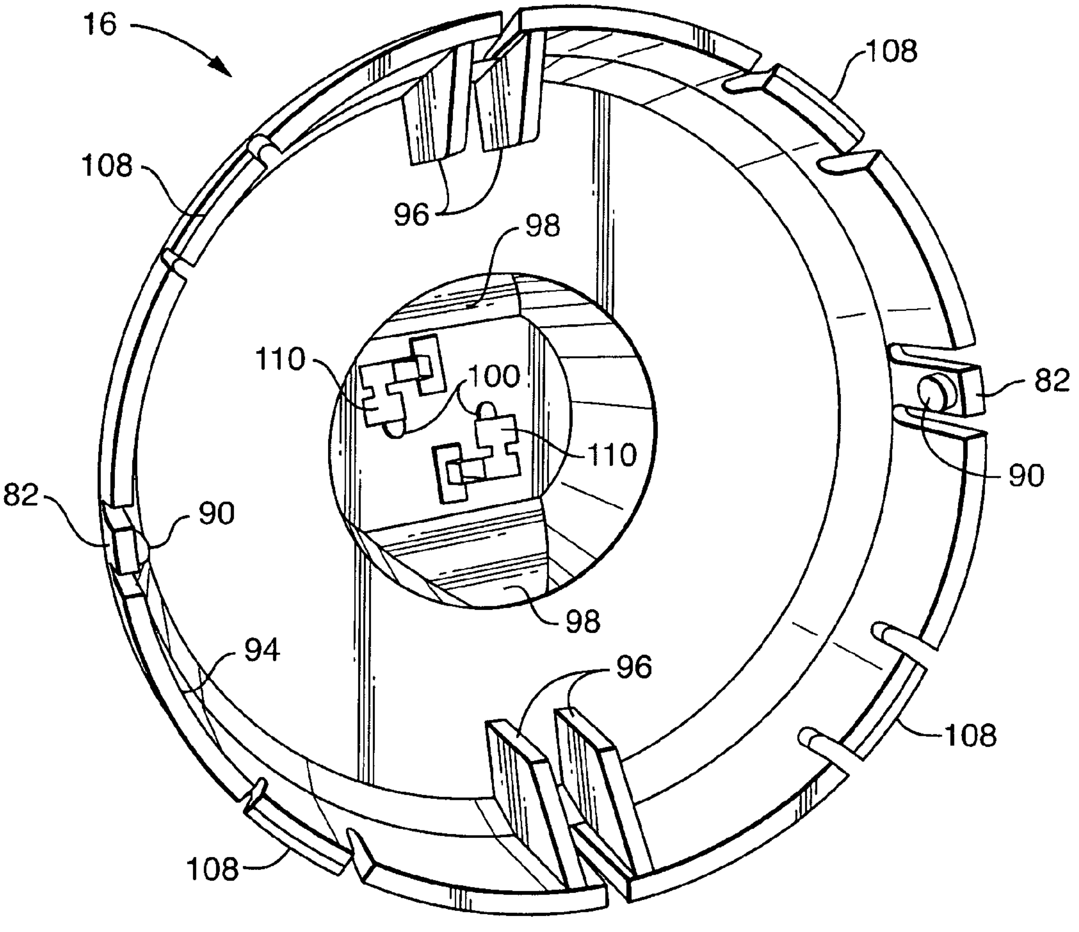
FIG. 6 shows a front perspective view of a preferred embodiment of an inner cover.
Figure 7:
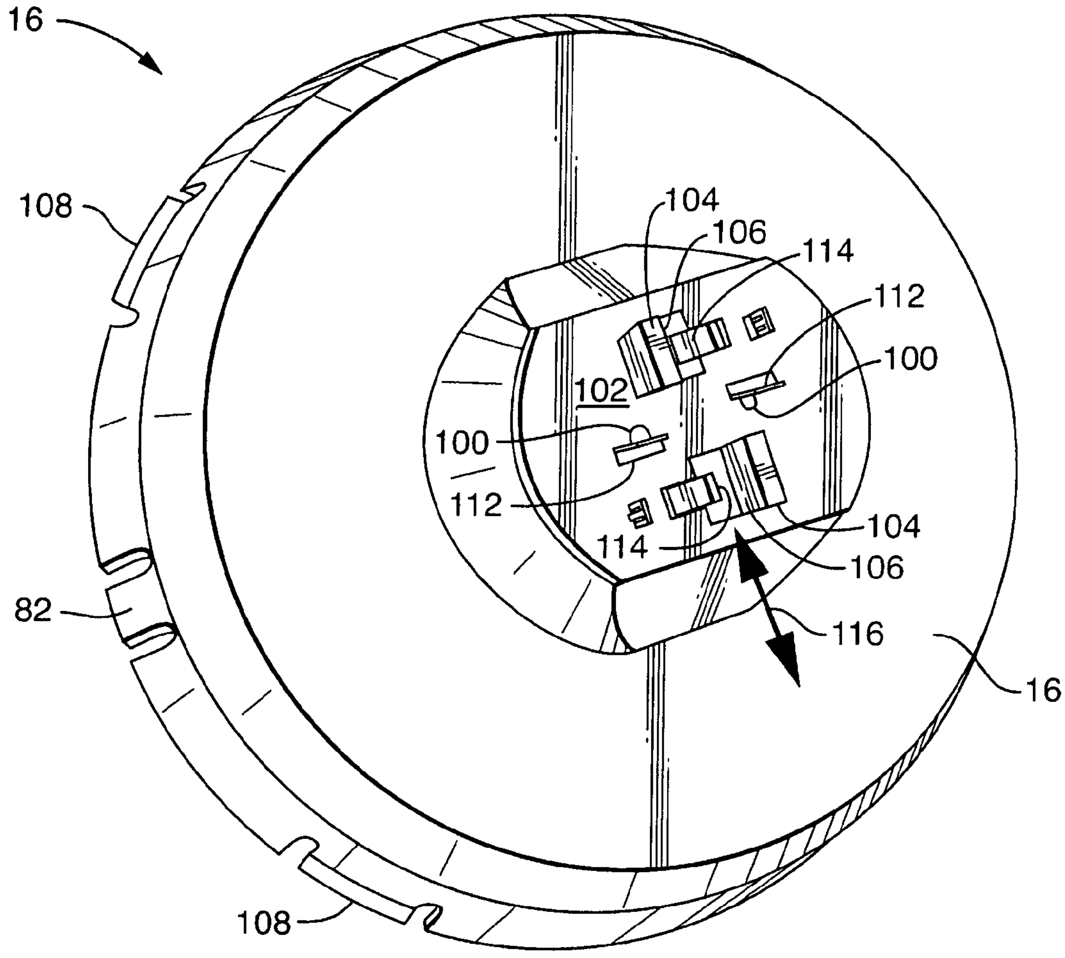
FIG. 7 shows a rear perspective view of a preferred embodiment of the inner cover of FIG. 6.

FIG. 6 shows a front perspective view of a preferred embodiment of an element in the preferred form of an inner cover 16. FIG. 7 shows a rear perspective view of the same preferred embodiment of the inner cover 16 of FIG. 6. The preferred inner element such as inner cover 16 may be made of a molded plastic resin and has the form of a concave shell that couples to the reflector 12 to cover a rear portion of the reflector 12. The preferred inner cover 16 is formed with at least one latch 82 with a latch face 90. The inner cover 16 is similarly formed with two or more alignment guides, such as slots 96 that are sized and spaced to mate with the alignment nubs 77 formed on the rear side 64 of the reflector 12. The inner cover 16 also includes an alignment face 98 that is sized and space so as to fit tightly adjacent the alignment face 70 of the neck 66. The preferred inner cover 16 is snap fitted to the recesses 76 and antirotational keyed to the nubs 77 by the slots 96.

The inner cover 16 is formed with at least one through passage 100 allowing the electrical leads 32, 34 of the lamp capsule 14 to be exposed along the rear side 102 of the inner cover 16 for electrical connection. It is convenient that the electrical leads 32, 34 extend through and beyond the thickness of the inner cover 16. The inner cover 16 may then be fitted to the rear side 64 of the reflector 12 butting against the alignment face(s) 70, the nubs 77 and snap fitting in recess 76. The preferred inner cover 16 is also formed with at least two stand up braces 104, block shaped projections, on the rear face 102 adjacent the through passages 100, having faces 106. The rear side of the inner cover 16 is formed with one or more latches, such as spring tab latches 108, that can couple with corresponding latch faces 136 formed on the inner wall of the outer cover 22. In the preferred embodiment the inner cover 16 is formed with four spring tab latches 108 positioned at 90 degrees around the forward rim of the inner cover 16.

In the preferred embodiment, one or more electrical clip 110 extend through the inner cover 16 with a first face 112 adjacent a respective one of the electrical leads 32, 34 and a spring tensioned second face 114 to be exposed adjacent a respective one of the coupling pads 122 of the circuit board 18 and formed with a spring tension to form a clamping trap with the face 106. In the preferred embodiment, for each electrical lead 32, 34 there is a corresponding electrical clip 110. Each clip 110 is coupled to the inner cover 16 in the neck region of the inner cover with a first face 112 adjacent a respective one the electrical leads 32, 34 and a second face 114 exposed along a linear slot region 116 and positioned to be opposite the front faces 106 of the braces 104. The preferred second faces 114 of the clips 110 are formed to have a spring tension in the direction of the braces 104. The respective electrical clips 110 are electrically coupled along the first faces 112 to the corresponding electrical leads 32, 34 for example by welding, soldering or crimping the respective electrical leads 32, 34 to the clip 110 respective along the first faces 112. The electrical clip 110 is electrically coupled to a corresponding one of the electrical leads 32, 34, and forms a socket like coupling for the circuit board 18. In the preferred embodiment, the electrical contact faces 114 are aligned to face in opposite directions, and are separated and offset from the linear slot 116 defining a channel along which the edge of the circuit board 18 butts into.

Figure 8:
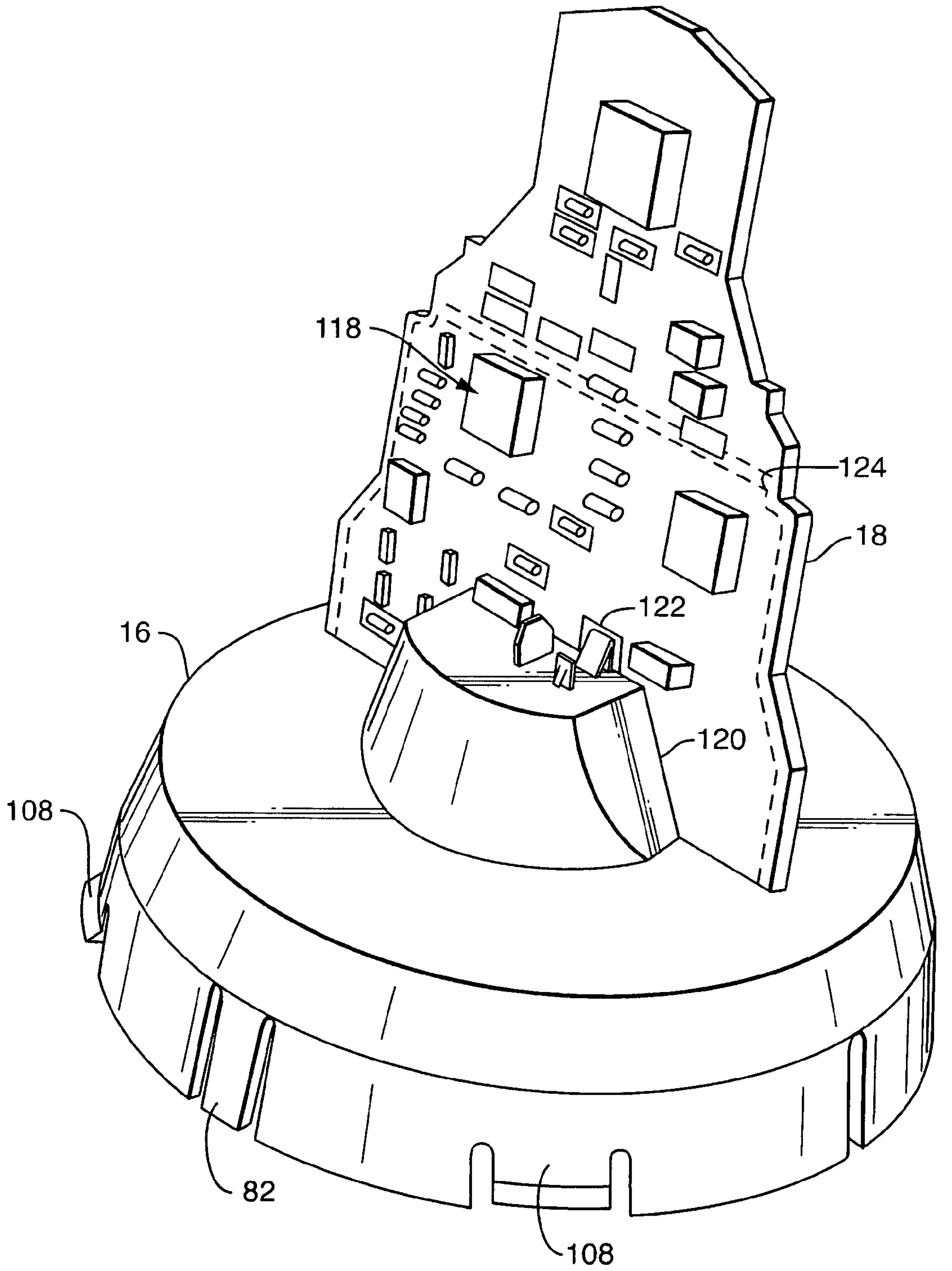
FIG. 8 shows a rear perspective view of a preferred embodiment of an inner cover coupled to a preferred embodiment of a circuit board.

FIG. 8 shows a rear perspective view of a preferred embodiment of an inner cover 16 coupled to a preferred embodiment of a circuit board 18. A planar circuit board 18 having control circuitry 118 for controlling electrical power supplied to the HID lamp capsule 36 is positioned so the circuit board 18 has an edge 120 mechanically coupled to the inner cover 16 and positioned to electrically contact the electrical coupling face 114 supported on the inner cover 16. In the preferred embodiment, the circuit board 18 is formed as a planar body having a thickness corresponding to the distance between the stand up brace face 106 and the spring tensioned second face 114 of the clip 110, so the edge 120 of the circuit board 18 may be securely slotted into and pinched between the clips 110 and the braces 104.

The circuit board 18 is formed with control circuitry 118 for controlling electrical power supplied to the HID lamp capsule 14. Various control circuits are known in the art, and any convenient one may be used according to the user's preference. The circuit board 18 is formed with respective electrical contacts, such as metal pads 122 or trace lines, formed on the circuit board 18 to contact the respective second faces 114 of the clips 110. The preferred contacts 122 are formed on opposite sides of the circuit board 18. Because the lamp capsule 14 is operated by a high voltage power supply, it is preferred to offset the lead inputs and outputs by insulation and distance. In the preferred embodiment, the electrical contacts are formed as metal pads 122 on opposite sides of the circuit board 18 and separated linearly along the edge 120 of the circuit board 18. This high resistance material forms a high resistance path between the lead couplings, thereby providing for high creep and contact clearance. This enables closer positioning of the circuit board. The electrical circuit board 18 is otherwise preferably extended rearward with the plane of the circuit board 18 extending parallel to the lamp axis 37 away from the lamp capsule 14 and the inner cover 16. The preferred circuit board 18 is otherwise formed with all circuit 118 components spaced so as to leave an open track 124 around the edge region and if necessary across the center region of the circuit board 118 that is wide enough so that an edge wall 126 of the heat sink 20 can pinch to the circuit board 18 without interfering with the circuit board 18 operations. The heat sink 20 while acting as a heat sink, then also encloses the relevant circuit board 18 components to provide a floating or pseudo ground EMI shield with respect to the circuit board 18.

Figure 9:
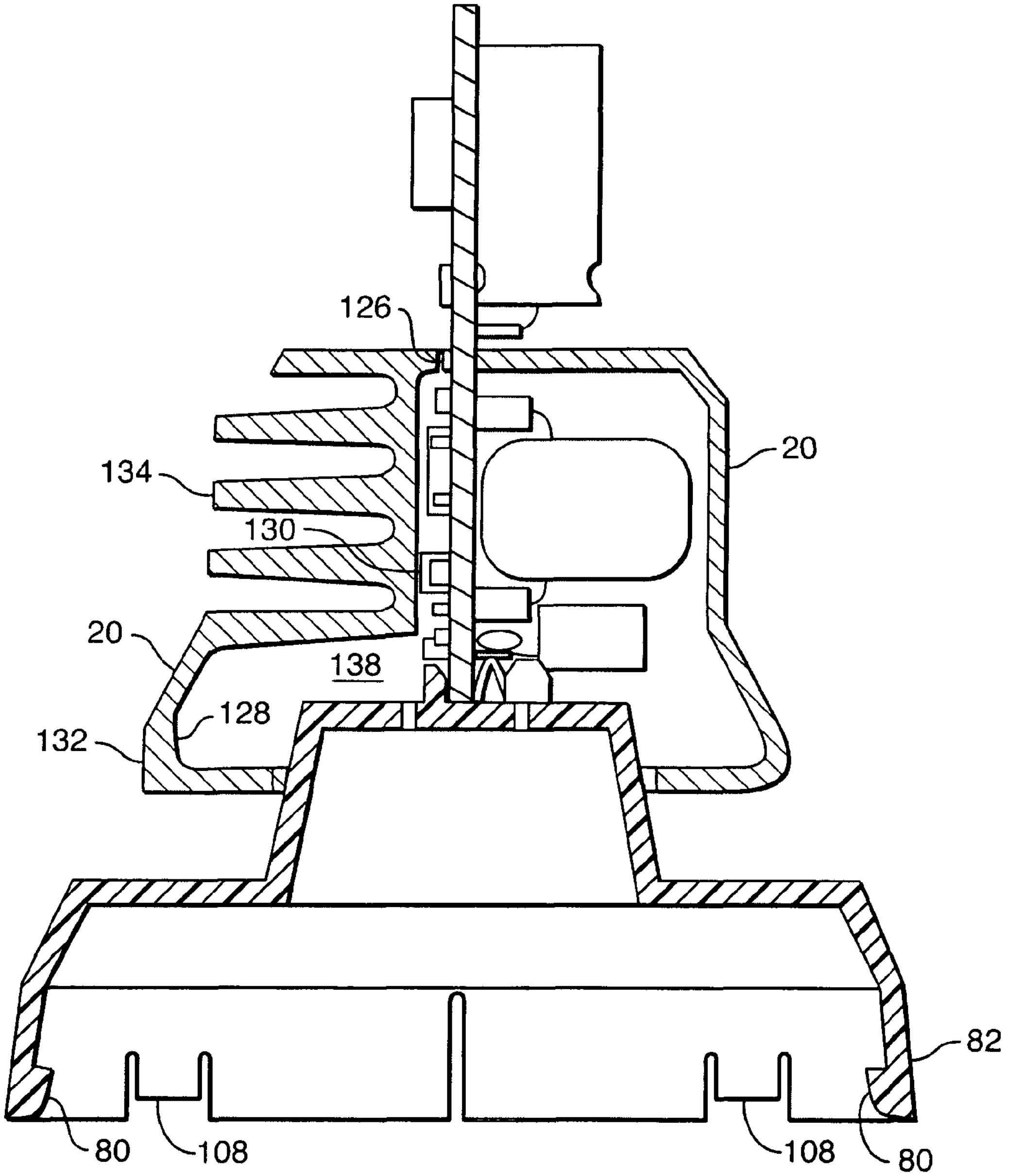
FIG. 9 shows a cross sectional view of a preferred embodiment of an inner cover coupled to a preferred embodiment of a circuit board enclosed in part by a preferred embodiment of a heat sink and EMI shield of FIG. 8.

FIG. 9 shows a cross sectional view of a preferred embodiment of an inner cover 16 coupled to a preferred embodiment of a circuit board 18 enclosed in part by a preferred embodiment of a heat sink and EMI shield 20. In the preferred embodiment, the circuit board 18 is surrounded by an electrically conductive heat sink 20. The preferred heat sink 20 has the form of a concave shell formed to span at least one side of the circuit board 18. In the preferred embodiment, the heat sink 20 is formed in two halves that bracket the circuit board 18. Preferably both sides of the circuit board 18 are then enclosed in the two half shells forming the heat sink 20 structure. The heat sink 20 has in internal side 128 with that preferably includes mechanical contacts 130 positioned adjacent the circuit board 18 or components formed thereon, for contact with the circuit board 18 or the components to conduct heat away from the circuit board 18 or components. The preferred heat sink 20 has an external side 132 formed with heat dispersing features, such as fins 134 and otherwise defines an electrically conductive, and substantially complete enclosure around at least any significant EMI emitting components carried on the circuit board 18. A significant EMI emitting component is one that emits sufficient EMI to make the final product unacceptable to a user, such are interference with a near by radio or TV receiver, telephone, CRT computer or similar device. The circuit board 18 is then enclosed by a heat sink 20 assembly forming a substantially closed electromagnetic interference (EMI) blocking housing. The combined heat sink and EMI shield 20 then provides a floating or pseudo ground with respect to the circuit board 118. It is understood that there may be some electrical connections or circuit board components that are insignificant EMI emitters that extend beyond the enclosed volume of the heat sink 20 structure, and that there may not be an exact hermetic seal between the circuit board 18 and the heat sink 20 structure, but that such openings may be constrained to be narrow, thereby providing minimal opportunity for EMI leakage out of the enclosed cavity 138. The preferred heat sink 20 includes along its exterior surface 132 one or more axially extending keying features such as axially extending slots to align and key with the outer cover 22. The Applicants have found it convenient to pinch the two half shells forming the heat sink 20 with tight contact from the adjacent inner wall of the outer cover 22.

Figure 10:
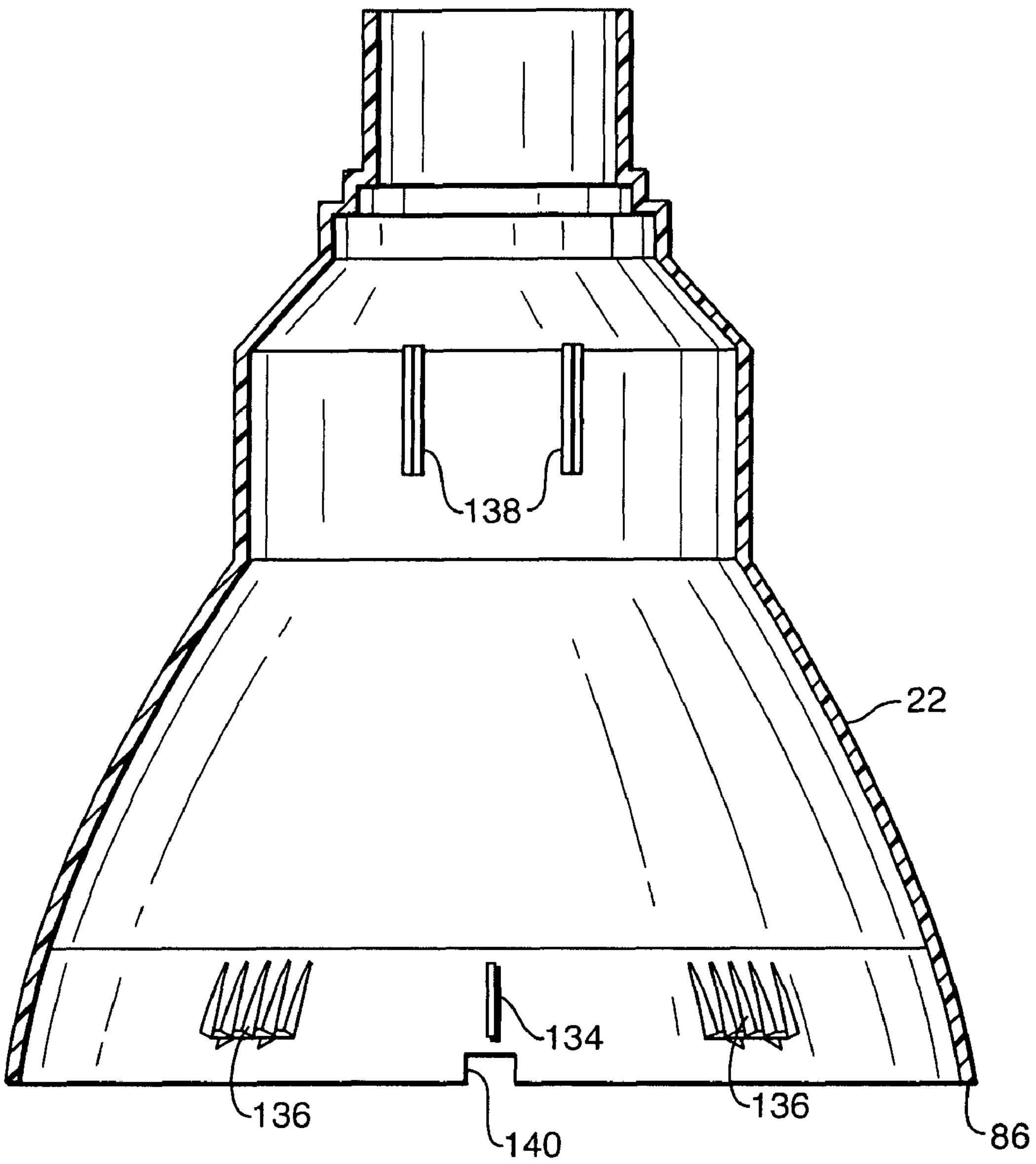
FIG. 10 shows a cross sectional view of a preferred embodiment of an outer cover.
Figure 11:
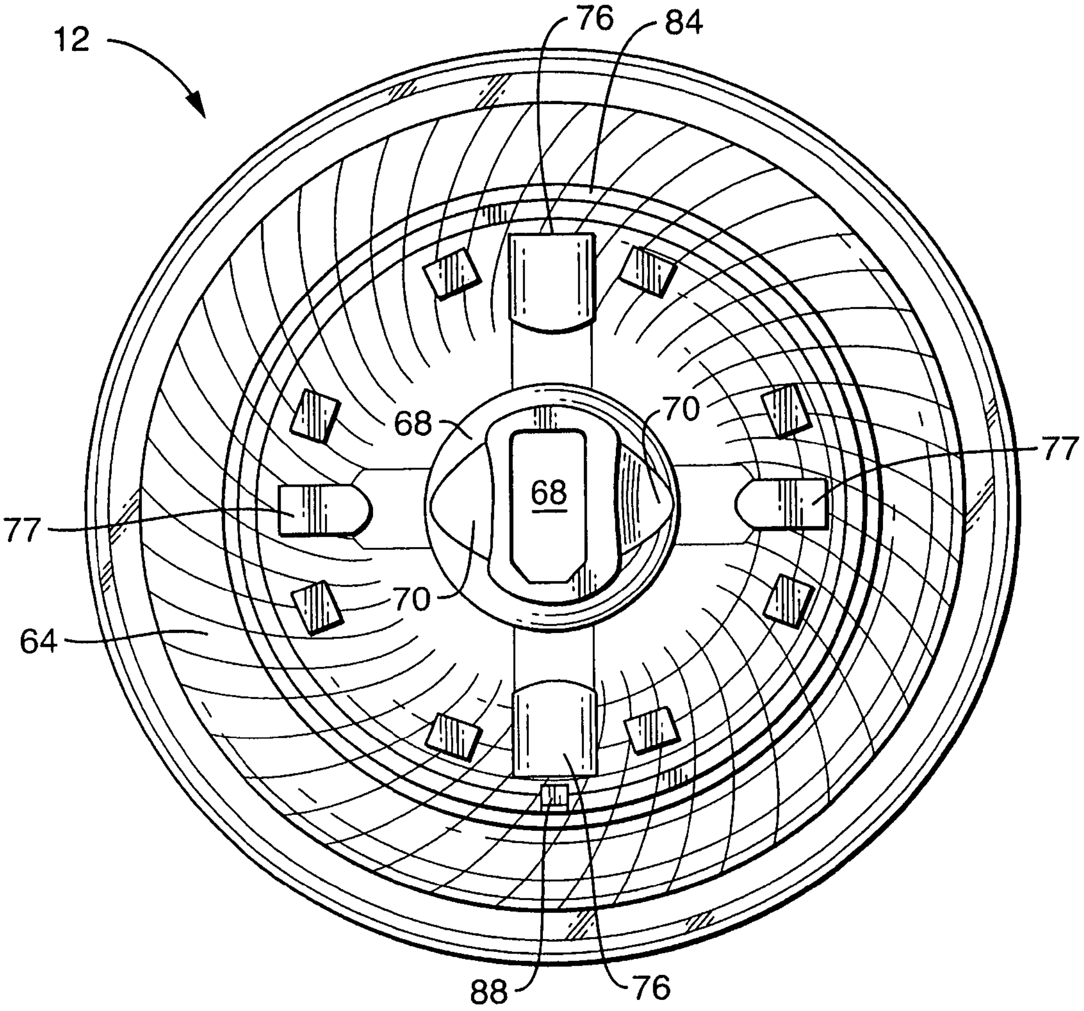
FIG. 11 shows a perspective view of a preferred embodiment of an electrically conductive spring tab.

FIG. 10 shows a cross sectional view of a preferred embodiment of an outer cover 22. The outer cover 22 encloses the inner cover 16, circuit board 18, and the heat sink 20 assembly. The outer cover 22 is coupled to or closed by the base 24 that has external electrical connections 130, 132 for coupling in an electrical socket (not shown), such as a typical threaded lamp socket to the internal electrical connections 32, 34 through the circuit board 18. The base 24 may be crimped, threaded, riveted, glued or otherwise attached to an end of the outer cover 22.

The outer cover 22 is shaped to enclose the inner cover 16, the circuit board 18, and heat sink 20. The outer cover 22 has internal contacts, couplings or wall portions such as an upstanding tab 134 positioned to be closely adjacent the exterior side of inner cover snaps 82. In this way, the tabs 134 of outer cover 22 pins the snaps 82 of the inner cover 16 in place against the snap recess 76 formed on the reflector 12. The snaps 82 along their respective rear sides (radially exterior sides) are then blocked by the inside wall of the outer cover, such as by the tabs 134 of the outer cover 22 and as a result are fixed in place against the snap recesses 76 and cannot be withdrawn until the outer cover 22 is moved to unblock the constrained snaps 82. The outer cover 22 also includes one or more internal or hidden latches 136 that couple to the corresponding latch(es) 108 on the inner cover 16. In the preferred embodiment, the outer cover 22 has four internal latches 136 positioned at 90 degrees around the axis to close respectively with the four latches 108 on the inner cover 16. The inner cover 16 is then covered by and blindly latched to the outer cover 22. Since the inner cover 16 and outer cover 22 are blindly latched the inner cover 16 and outer cover 22 cannot be separated once they are snapped together. In the preferred embodiment the outer cover also includes one or more guides 138, such as axially extending ribs that key with corresponding keys, such as axially extending slots (not shown) formed on the exterior surface 132 of the heat sink 20. As the outer cover 22 is positioned over the inner cover 16, the guides 138 slidingly key with the matching keys, such as slots, of the heat sink 20, aligning the inner assembly and the outer cover 22. The outer cover 22 also includes a key, such as a notch 140 formed to mate with a corresponding key feature, such as an upstanding nub 88 formed on the reflector 12. The reflector 12 and the outer cover 22 are then keyed one to the other, and cannot be axially rotated separately when properly positioned. In the preferred embodiment, the outer cover 22 is further braced along its forward rim 86 against the reflector ledge 84 to be further stabilized with respect the reflector 12. Alternatively the outer cover 22 could be coupled along the forward rim 85 of the reflector 12. The outer cover 22 need not be glued to the reflector 12. It is understood that a glue or water sealant could be applied along the exterior facing seams of the assembly for water sealing, but it is not necessary for mechanical coupling of the assembly. The outer cover 22 is then aligned by and axially snap fitted to latch elements formed on the assembly of the reflector 12, the inner cover 16 and the heat sink 20 structures. The outer cover 22 may further include one or more internally formed guides, such as slots or notches that exposed edge portions of the circuit board 18 can be inserted in or aligned with. Once in position, the outer cover 22 is then permanently aligned by and clipped to the reflector, inner cover, circuit board and heat sink assembly. It cannot be unclipped from, or rotated with respect to the reflector, inner cover, circuit board and heat sink assembly.

The base 24 may be coupled to the outer cover 22 and formed with external electrical connections 130, 132 for coupling in a lamp socket, such as a threaded socket. One of the typical threaded base couplings may be used. The base 24 otherwise provides internal electrical connections to the circuit board 18.

The lamp may be assembled by loosely clamping the heat sink and EMI shield to the circuit board. The circuit board and heat shield assembly is then inserted in the outer cover, aligning the guide features (slots) of the heat shield with the corresponding features (tabs) formed on the interior of outer cover. The heat sink EMI shield is then pinned or pinched in close contact with the circuit board by wedging pressure from the outer cover. The inner cover is aligned by the alignment faces and nubs formed on the rear of the reflector and clipped to the latch features formed on the rear of the reflector. The lamp capsule, alignment ring and grounding clip assembly are then inserted into the front side of the reflector with the capsule leads threaded through the openings in the inner cover adjacent the weld points. Simultaneously the EMI contact arm is forced into conductive contact with the metallized surface of the reflector, and the positioning ring is settled with its alignments along the front side of the reflector. The lamp leads are then welded (soldered, or crimped) to the contact points on the clips supported on the inner cover. The outer cover assembly is then aligned with and pressed onto the reflector assembly. The circuit board is then captured in the alignment channel (slot), and electrically coupled to the lamp leads through the clips grasping or clamping the edge of the circuit board. The outer cover then latches to the inner cover, while simultaneously positioning closely behind the inner cover latches, blocking the withdrawal of the latches form the reflector. The outer cover assembly is thereby permanently latched to the reflector assembly. Leads from the circuit board are then coupled to the threaded base, and the threaded base is fixed to the cover, for example by crimping an edge of the threaded base to the outer cover. A cover lens may then be fitted to the front of the reflector and fixed in place for example by silicone cement, epoxy or flame sealing.

While there have been shown and described what are at present considered to be the preferred embodiments of the invention, it will be apparent to those skilled in the art that various changes and modifications can be made herein without departing from the scope of the invention defined by the appended claims.

What is claimed is:

1. An integral HID lamp assembly comprising:

a reflector having a wall defining a cavity having an electrically conductive metal layer providing a light reflective surface;

a high intensity discharge (HID) lamp having a first electrode and a second electrode positioned in the reflector, and electrically coupled by a first lead and a second lead to an electronic control circuit to drive the HID lamp;

wherein one of the first and the second leads is coupled to a clip, said clip being disposed within the cavity of the reflector and providing an electrical connection between said one lead and the metal layer.

2. The lamp assembly in claim 1, wherein the lamp capsule is aligned axially in the reflector with the first electrode generally aligned toward a base end of the lamp and the second electrode is aligned in a forward direction disposed toward a field to be illuminated and the second electrode lead is electrically coupled to the metal layer; and the metal layer extends in the forward direction farther than any electrically conductive portion of the HID lamp, the electrodes and the leads electrically coupling to the electrodes.

3. The lamp assembly in claim 1, wherein electrical connection to the metal layer is made by a metal arm under mechanical tension pressed against the metal layer.

4. The lamp assembly in claim 1, wherein electrical connection to the metal layer is made by a metal arm under mechanical tension pressed against a metal contact coupling to the metal layer.

5. An integral HID reflector lamp assembly comprising:

an integral HID lamp capsule having a wall defining an enclosed volume, a sealed end with at least two extending electrical connections;

a reflector in the form of concave shell with a front side and a rear side, and a neck defining a through passage, a reflective surface on the front side made of a deposited metal, the HID lamp capsule positioned in the neck to face the reflective surface and the electrical connections exposed for electrical connection at an end of the neck adjacent the rear side;

wherein a lamp lead is coupled to a clip, said clip being disposed within an interior of the reflector, said clip being electrically coupled to the reflective surface to provide an electrical connection between said lamp lead and said reflective surface;

an outer cover enclosing and coupled to the assembly of the reflector and the HID lamp capsule;

and a threaded base coupled to the outer cover and having external electrical connections for coupling in a threaded electrical socket and internal electrical connections coupled to a circuit board.

6. The lamp assembly in claim 5, wherein the electrical connection is made by a spring contact supported adjacent the sealed end and electrically connecting a lamp lead and the reflective metal surface.

7. The lamp assembly in claim 6, wherein the spring contact is supported on said clip clasping the sealed end of the HID lamp capsule, said clip comprising metal, said spring contact, electrically coupled to said one lead for the HID lamp capsule, and a compressible spring arm extending from said clip between the HID lamp capsule and the deposited metal.

8. An integral HID lamp assembly comprising:

a reflector having a wall defining a cavity having an electrically conductive metal layer providing a light reflective surface;

a high intensity discharge (HID) lamp having a first electrode and a second electrode positioned in the reflector, and electrically coupled by a first lead and a second lead to an electronic control circuit to drive the HID lamp;

wherein the lamp capsule is aligned axially in the reflector with the first electrode generally aligned toward a base end of the lamp and the second electrode is aligned in a forward direction disposed toward a field to be illuminated and the second electrode lead is electrically coupled to the metal layer; and the metal layer extends in a forward direction farther than any electrically conductive portion of the HID lamp, the electrodes and the leads electrically coupling to the electrodes;

wherein said second lead is coupled to a clip, said clip being disposed within the cavity of the reflector and coupled to the reflective surface to provide an electrical connection between said second lamp lead and said reflective surface.

* * * * *